No. 784,558. PATENTED MAR. 14, 1905.
C. GIELOW.
EDGE RUNNER AND PAN.
APPLICATION FILED JAN. 29, 1904.

ATTEST.
C. A. Middleton
Edward Saxton

INVENTOR.
CHRISTIAN GIELOW.
BY Richards & Co.
ATTYS

No. 784,558. Patented March 14, 1905.

UNITED STATES PATENT OFFICE.

CHRISTIAN GIELOW, OF GÖRLITZ, GERMANY, ASSIGNOR OF ONE-HALF TO BRUNO ALEXANDER-KATZ, OF GÖRLITZ, GERMANY.

EDGE-RUNNER AND PAN.

SPECIFICATION forming part of Letters Patent No. 784,558, dated March 14, 1905.

Application filed January 29, 1904. Serial No. 191,213.

*To all whom it may concern:*

Be it known that I, CHRISTIAN GIELOW, a subject of the King of Prussia, Emperor of Germany, residing at 28 Jakobstrasse, Görlitz, in the Kingdom of Prussia and Empire of Germany, have invented new and useful Improvements in Edge-Runners and Pans, of which the following is a specification.

This invention relates to edge-runners and pans.

Edge-runners and pans having stepped grinding-surfaces for reducing the material by steps are well known. These mills have, however, the drawback that the initial reduction bears no proper relation to the final reduction, thus detracting from the effectiveness of such mills. According to this invention the said drawback is to be obviated by arranging the runners at different distances from the grinding-surface in such a manner that the part of the runner to which the material is conducted first will be farthest from the grinding-surface, while the part which acts upon the material last bears upon the grinding-surface.

In the accompanying drawings a preferred constructional form of the said invention is represented by way of example.

Figure 1:
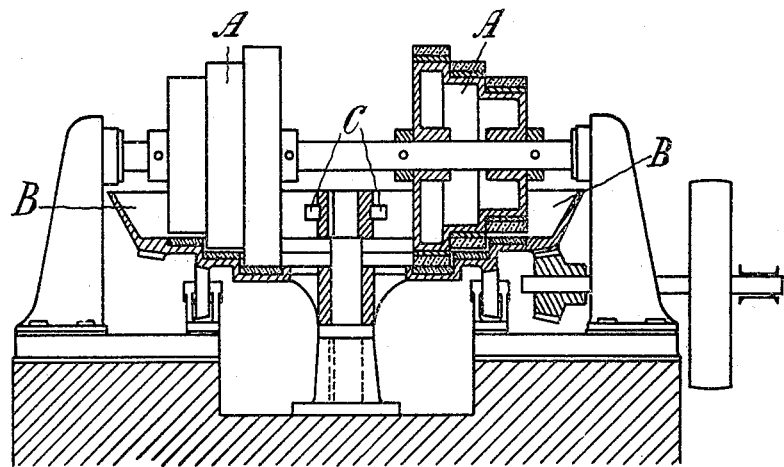
Figure 2:
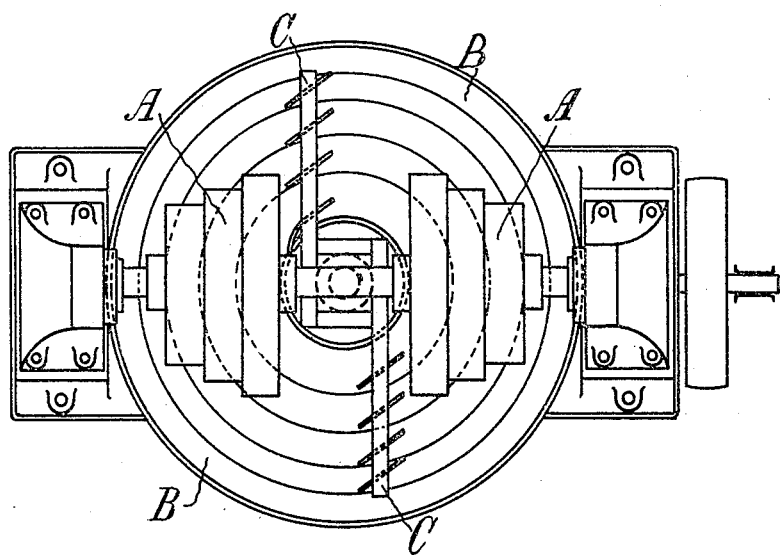

Figure 1 is a side elevation, partly in vertical section, of the improved mill. Fig. 2 is a plan of the same.

In this constructional form the stepped runner A is of such a shape that only the runner-step having the largest diameter bears directly upon the pan B, while the other runner-steps stand off more or less from the pan B, move freely, and turn at different circumferential speeds. The proper reduction and intimate mixing are obtained by the pan being provided in the known manner with a continuous grinding-surface and the material to be treated being gradually ground from step to step in the known manner and completely pulverized.

In the improved edge-runner and pan shown in the drawings the material to be treated is conducted from the outside of the pan B, which is arranged to be driven by positive motion. In this pan it is conveyed in the known manner, through the agency of a scraper C, by steps below the runners A and is gradually reduced and mixed, leaving the pan B in the middle in a completely-pulverized condition. It is optional to introduce the material in the middle of the pan and allow the same to leave the pan on the outside. The arrangement may also be such that the runner-step having the smallest diameter bears directly upon the pan and that the runner-step having the largest diameter is at the greatest distance from the pan.

The improved mill is adapted to be used both for dry grinding and wet grinding and may be made either with a stationary grinding-surface or with a revolving grinding-surface.

The number of the runner-steps is optional and depends mainly on the kind of material to be ground and on the fineness of the finished product.

What I claim as my invention, and desire to secure by Letters Patent, is—

1. In an edge-runner and pan of the character described, the stepped grinding-surface and the stepped runners, which latter are arranged coaxially, and of whose steps the one which acts last upon the material to be ground bears upon the corresponding step of the grinding-surface, while each of the other steps is at an equal distance from the corresponding step of the grinding-surface throughout the width of such runner-step, the distance of the succeeding runner-steps from the corresponding steps of the grinding-surface increasing gradually to that of the steps to which the material to be ground is conducted first, substantially as and for the purpose herein set forth.

2. In an edge-runner and pan of the character described, the stepped grinding-surface and the stepped runners, which latter are arranged coaxially, and of whose steps the largest one bears upon the corresponding step of the grinding-surface, while each of the other steps is at an equal distance from the corresponding step of the grinding-surface throughout the width of such runner-step, the distance of the succeeding runner-step from the corresponding steps of the grinding-surface increasing gradually to the smallest runner-step, substantially as and for the purpose set forth.

In testimony whereof I have signed my name to this specification in the presence of two subscribing witnesses.

CHRISTIAN GIELOW.

Witnesses:
OTTO BÖHME,
CHEMNITZ H. SCHILLING.